United States Patent [19]
Yoshihiro et al.

[11] Patent Number: 5,930,063
[45] Date of Patent: *Jul. 27, 1999

[54] VARIABLE-SPEED PLAYBACK APPARATUS FOR DIGITAL VIDEO SIGNALS

[75] Inventors: Toshitaka Yoshihiro, Kanagawa; Masahiko Nagumo; Masato Yamaoka, both of Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/542,126

[22] Filed: Oct. 12, 1995

[30] Foreign Application Priority Data

Oct. 21, 1994 [JP] Japan .................................. 6-282821

[51] Int. Cl.$^6$ .................................................. G11B 21/04
[52] U.S. Cl. ...................... 360/70; 360/77.13; 360/73.09; 386/79; 386/80
[58] Field of Search ................................. 360/10.2, 73.08, 360/73.05, 73.11, 73.12, 73.09, 70, 10.3, 72.2, 77.13; 358/312; 386/78, 79, 80, 81

[56] References Cited

U.S. PATENT DOCUMENTS

| | | | |
|---|---|---|---|
| 4,811,130 | 3/1989 | Takayama | 360/73.11 |
| 5,057,949 | 10/1991 | Suga | 360/70 |
| 5,262,905 | 11/1993 | Takagi et al. | 360/53 |
| 5,299,073 | 3/1994 | Dorricott | 360/73.12 |
| 5,477,398 | 12/1995 | Ichikawa et al. | 360/10.2 X |
| 5,490,017 | 2/1996 | Nakamura et al. | 360/10.2 |
| 5,532,835 | 7/1996 | Nakagaki et al. | 360/10.2 X |

FOREIGN PATENT DOCUMENTS

| | | |
|---|---|---|
| A-0 431 897 | 6/1991 | European Pat. Off. . |
| A-0 560596 | 9/1993 | European Pat. Off. . |
| A-0 564 234 | 10/1993 | European Pat. Off. . |
| A-0 618567 | 10/1994 | European Pat. Off. . |

*Primary Examiner*—Alan Faber
*Attorney, Agent, or Firm*—Frommer Lawrence & Haug, LLP.; William S. Frommer; Dennis M. Smid

[57] ABSTRACT

A variable-speed playback apparatus and method for reproducing digital video signals recorded in tracks of a recording medium, such as a magnetic tape. A track number and a synchronization block number may be obtained from the magnetic tape and utilized to form a trace phase. Such trace phase is compared to a reference trace phase so as to obtain a phase error which is used to control the tape speed. As a result, the tape traveling speed may be controlled with a relatively high accuracy.

6 Claims, 9 Drawing Sheets

UNUPDATED PORTION

VARIABLE-SPEED PLAYBACK APPARATUS FOR DIGITAL VIDEO SIGNALS

BACKGROUND OF THE INVENTION

1. Field of the Invention

The present invention relates to an apparatus for reproducing a digital signal from a magnetic tape at a tape traveling speed different from that at which the digital signal was recorded into the magnetic tape.

2. Description of Related Art

Figure 6:
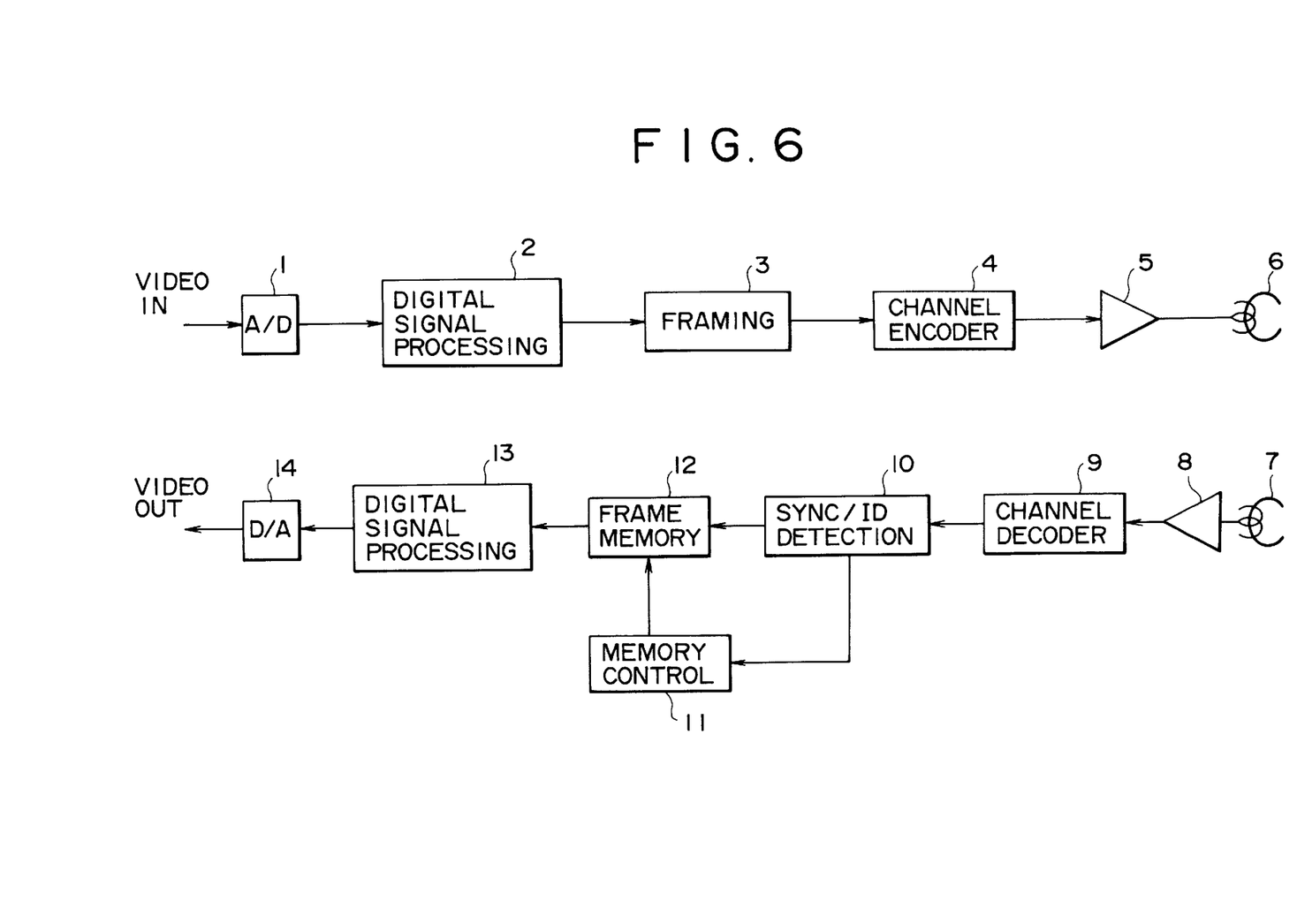
FIG. 6 is a simplified block diagram of a video-signal processing system employed in a digital VTR of the related art.

A video tape recorder, referred to hereafter as a digital VTR, for converting an analog video signal into digital video data, compressing the amount of the data and recording as well as reproducing the compressed digital video data is under development. A simplified block diagram of a video-signal processing system employed in such a digital VTR is shown in FIG. 6. First of all, video signal processing in the digital VTR is explained by referring to this figure.

An input analog video signal is converted into digital video data by an A/D converter 1 before being supplied to a digital signal processing circuit 2. The digital signal processing circuit 2 carries out a shuffling process and data compression by using a DCT process and variable-length coding on the digital video data supplied thereto. A signal output by the digital signal processing circuit 2 is then supplied to a framing circuit 3. The framing circuit 3 frames the video data supplied thereto into a predetermined format and, at the same time, adds parity codes for error correction, synchronization codes and IDs. A signal output by the framing circuit 3 is subsequently sent to a channel encoder 4. The channel encoder 4 carries out predetermined recording modulation processing on the video data supplied thereto. Then, the output of the channel encoder 4 is amplified by a recording amplifier 5 before being recorded into a magnetic tape, not shown in the figure, by a transducer such as a magnetic head 6.

Video data reproduced in a playback operation from the magnetic tape, not shown in the figure, by a magnetic head 7 is amplified by a playback amplifier 8. A signal output by the playback amplifier 8 then undergoes demodulation, a counterpart of the recording modulation process described above, in a channel decoder 9 before being supplied to a sync/ID detecting circuit 10. The sync/ID detecting circuit 10 detects the synchronization codes and the IDs added to the video data and supplies them to a memory control circuit 11. The video data itself is supplied to a frame memory unit 12. At that time, only video data with an ID having an error flag set at a low level is stored in the frame memory unit 12. Here, error correction based on parity codes and a deframing process are carried out on the video data before being supplied to a digital signal processing circuit 13. The digital signal processing circuit 13 performs data decompression through decoding of the variable-length codes and a reversed DCT process on the video data supplied thereto. The digital signal processing circuits 13 further carries out a deshuffling process on the video data and supplies its output to a D/A converter 14. The D/A converter 14 converts the digital video data back into an analog video signal output.

Figure 7:
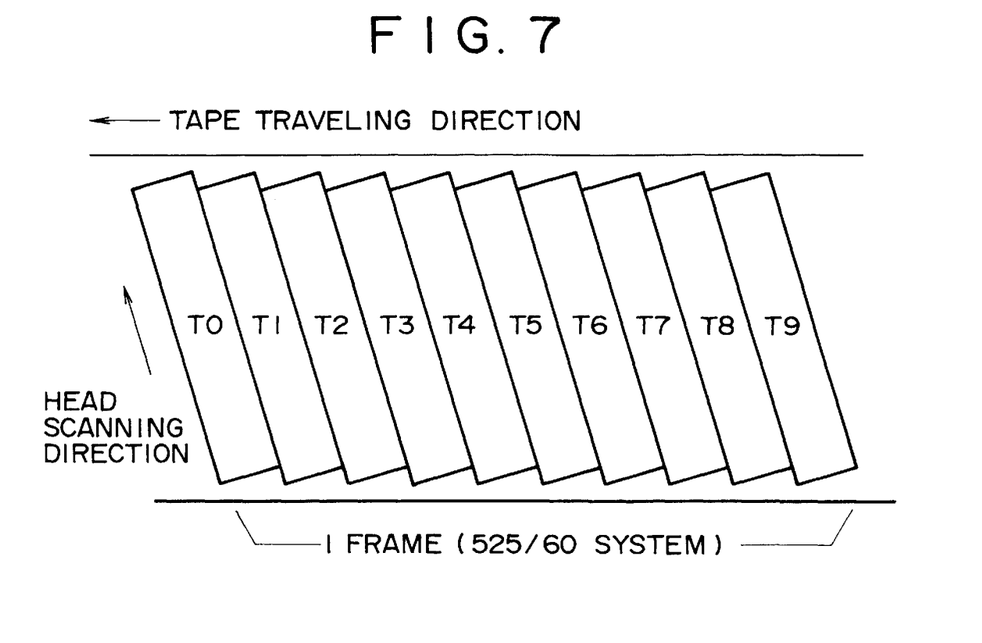
FIG. 7 is a typical recording track pattern of a digital VTR of the related art.

A typical recording track pattern is shown in FIG. 7. As shown in the figure, in the case of a 525/60 system, a frame of a video signal is divided and recorded into 10 tracks. It should be noted that, in the case of a 625/50 system, a frame is recorded into 12 tracks. In addition, this track pattern is formed by a pair of heads having azimuth angles different from each other. The heads, which are referred to hereafter as two facing heads, are installed at positions on a circumference of a rotating drum separated from each other by an angle of 180 degrees. The track pattern can also be created as well by double azimuth heads installed at positions close to each other.

Figure 8:
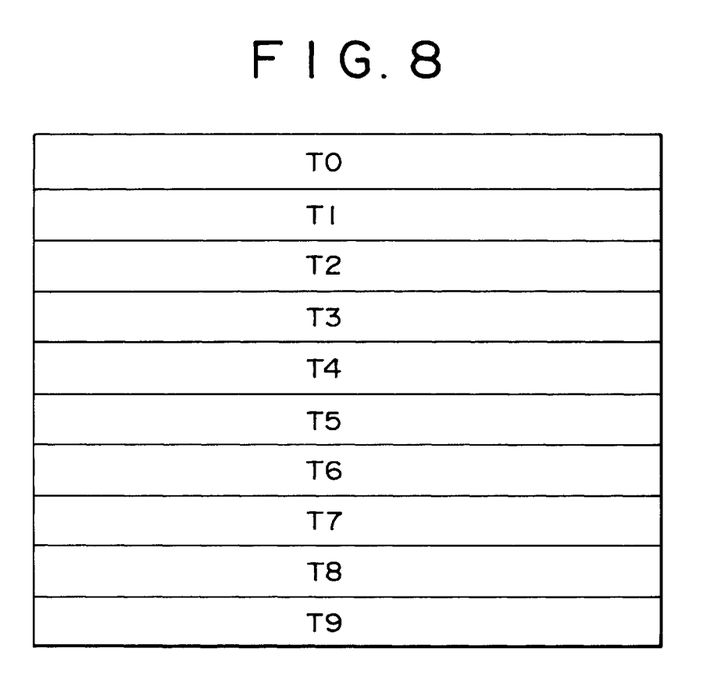
FIG. 8 is a diagram showing a relation between video data recorded in each track and the screen.

A relation between video data recorded on tracks and the screen is shown in FIG. 8. As shown in the figure, each one-tenth of the height of the screen from the top to the bottom of the screen is stored in a track.

Figures 9A, 9B:
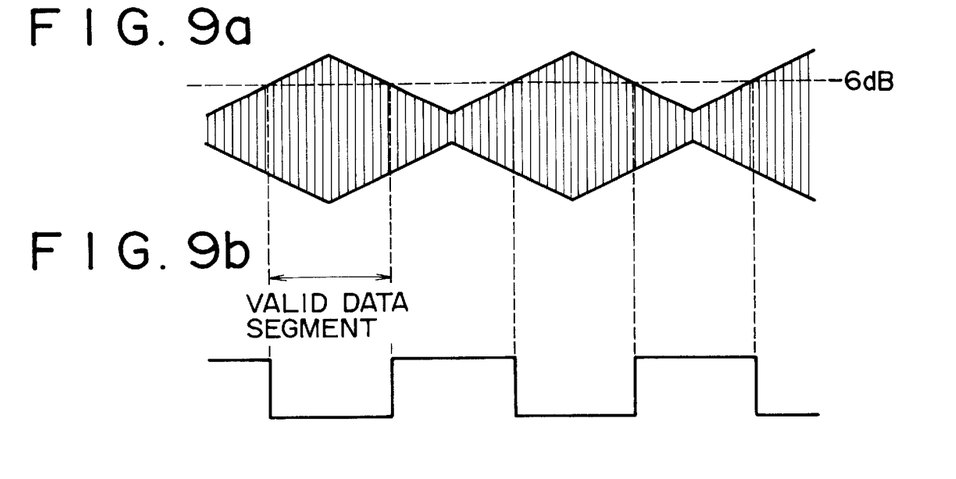
FIGS. 9A and 9B are diagrams showing a relation between the RF output level obtained in a variable-speed playback operation and valid data.

Let us think of a playback operation in a VTR with a configuration described above with a tape traveling speed different from that at which video data was recorded. Such a playback operation is referred to hereafter as a variable-speed playback. As is generally known, during a variable-speed playback, the magnetic head moves along a plurality of recording tracks, reproducing a video signal. In addition, since adjacent tracks are used for recording data with azimuths opposite to each other, the waveform of an RF signal output by the playback amplifier 8 shown in FIG. 6 looks like balls of an abacus as shown in FIG. 9A. At that time, only a segment with an ID error flag of FIG. 9B set at a low level is stored in the frame memory unit 12 shown in FIG. 6. Such a segment is referred to as a valid data segment. Only video data of such a segment is used as an update of the frame memory unit 12. As a result, an updated picture is played back.

Figure 10:
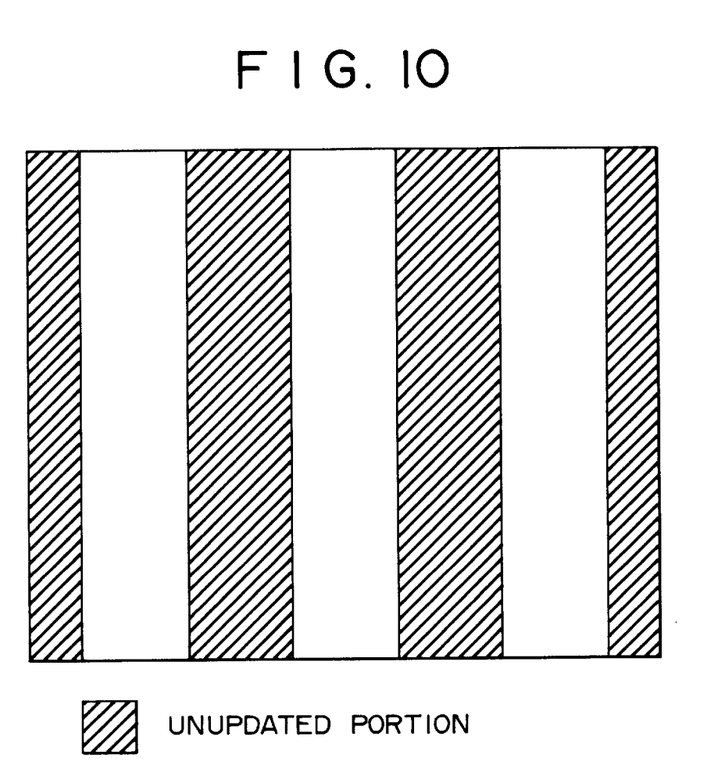
FIG. 10 is a diagram showing an update pattern at a 9.0-fold speed.
Figure 11:
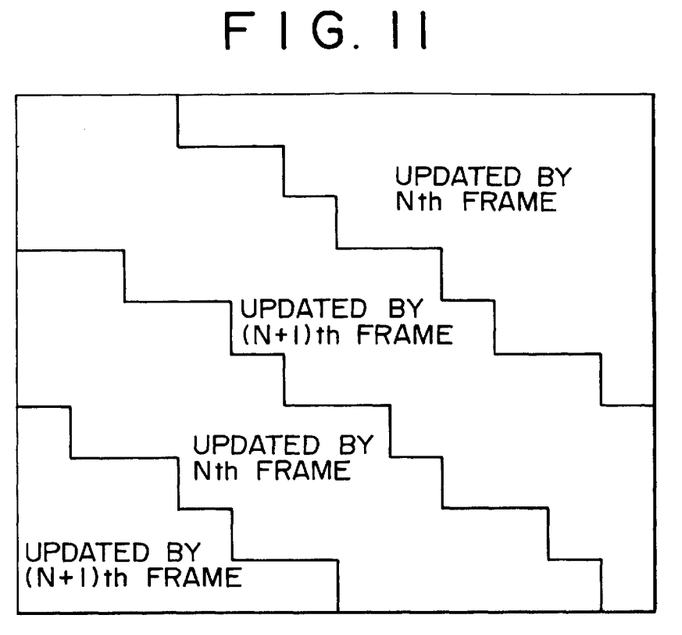
FIG. 11 is a diagram showing an update pattern at a 9.5-fold speed.
Figure 12:
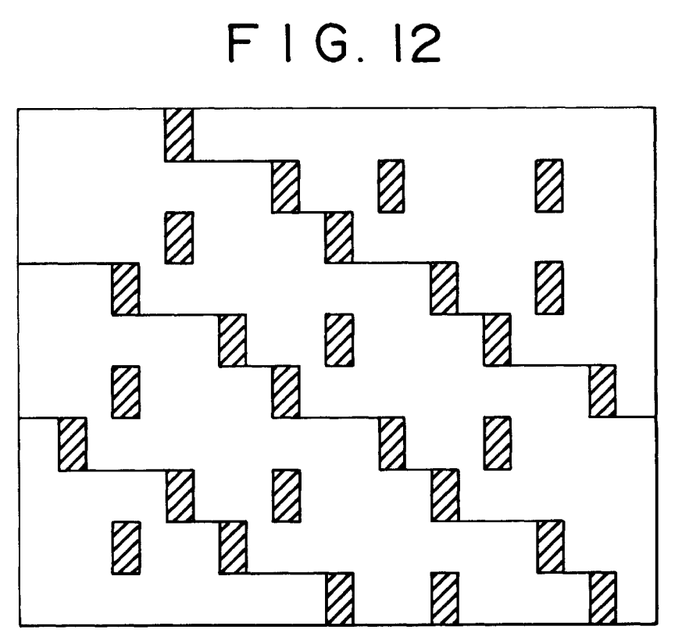
FIG. 12 is a diagram showing an update pattern at a 9.5-fold speed with a low data acquisition rate.

A pattern with an updated picture depends on the traveling speed of the magnetic tape. For example, in the case of a speed 9.0 times the normal traveling speed, an updated pattern like the one shown in FIG. 10 is created, resulting in a screen with portions thereof not updated at ordinary times. In the case of a 9.5-fold speed, on the other hand, an updated pattern like the one shown in FIG. 11 is created, reproducing video data of the entire screen. It is obvious that, by merely varying the speed of the magnetic tape even slightly, the appearance of the screen changes much. However, it should be noted that, even in the case of a 9.5-fold speed, an unupdated portion appears on the screen as shown in FIG. 12 if the acquisition rate of the data decreases. The acquisition rate is defined as a value indicating a level down from the peak of an RF output in terms of percents, up to which level the RF output can be acquired as valid data. If the traveling speed of the tape is shifted slightly to 9.48 times for example, however, updating becomes possible even though it is not possible at a 9.5-fold speed.

The above description indicates that it is necessary to select a tape speed so as to produce a screen that is easy to watch and includes no unupdated portions in order to sustain a good screen quality in a variable-speed playback operation.

SUMMARY OF THE INVENTION

Addressing the problem described above, it is an object of the present invention to provide a variable-speed playback apparatus for digital video signals that allows the tape traveling speed to be controlled with a high degree of accuracy during a variable-speed playback operation.

In order to solve the problem described above, the present invention provides a variable-speed playback apparatus for reproducing a digital video signal comprising track numbers and synchronization block numbers from a magnetic tape at a variable speed, wherein the apparatus comprises means for detecting the trace phase of the magnetic head based on a reproduced track number and a synchronization block number, and means for setting a reference trace phase in accordance with the variable playback speed, and is characterized in that a phase error, a difference between the trace phase of the magnetic head and the reference trace phase, is supplied to a speed control system for controlling the speed of the magnetic tape.

According to the present invention, the trace phase of the magnetic head is detected based on a reproduced track number and a synchronization block number. In addition, a phase error is found as a difference between this trace phase and the reference trace phase set in accordance with the variable playback speed. The phase error is then supplied to the speed control system for controlling the speed of the magnetic tape. The traveling speed of the magnetic tape can thereby be sustained at a desired variable playback speed.

DETAILED DESCRIPTION OF THE PREFERRED EMBODIMENTS

The present invention will become more apparent from the following detailed description of preferred embodiments with reference to accompanying diagrams.

[1] Principle of the Present Invention

Figure 1:
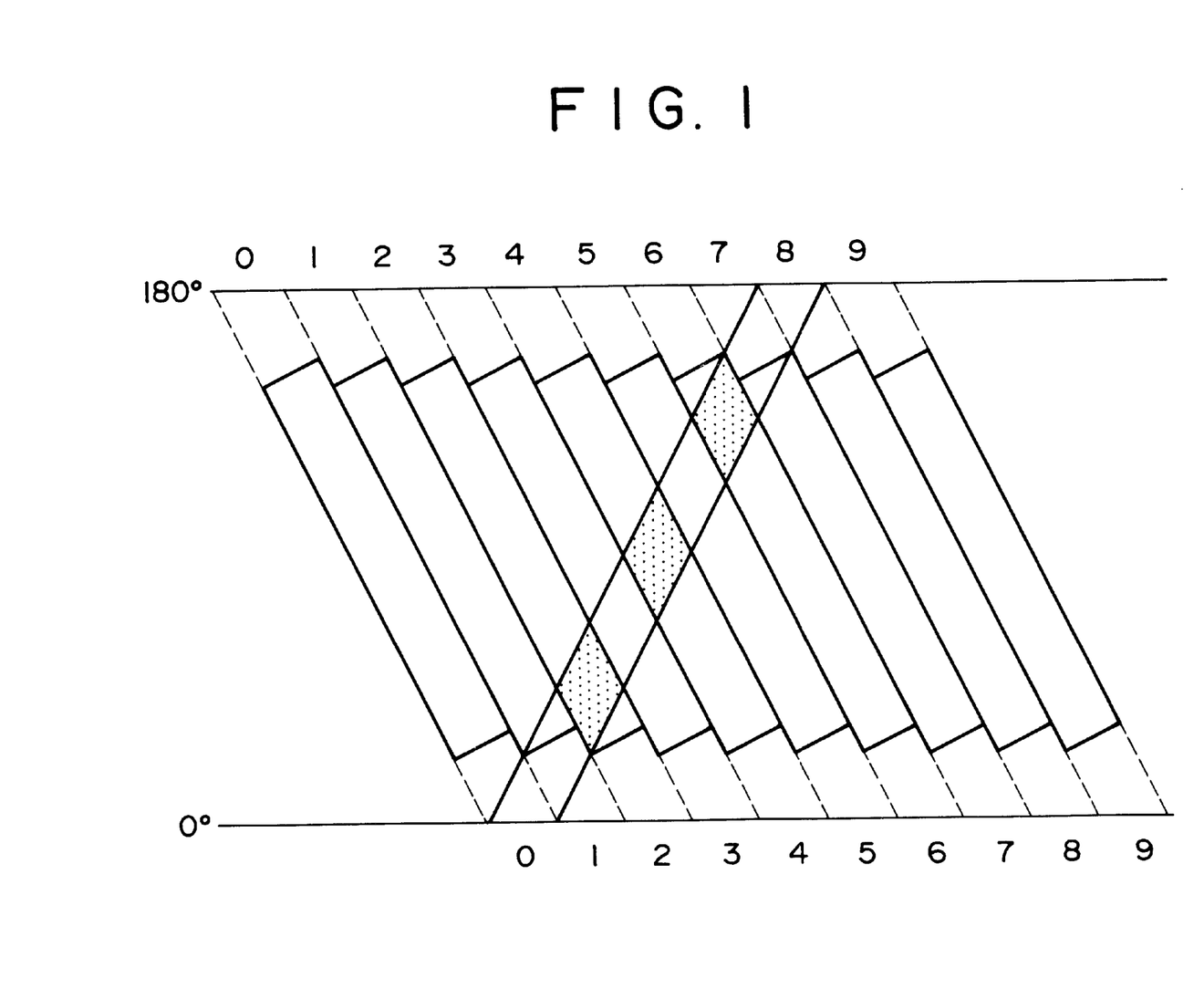
FIG. 1 is a diagram showing a typical head trace pattern at a 9.0-fold speed.

A typical head trace pattern obtained in a playback operation at a speed 9.0 times the normal traveling tape speed using two facing heads is shown in FIG. 1. It should be noted that the numbers 0 to 9 shown in the figure are track numbers of a frame unit. In addition, since the azimuth angles of the playback heads are associated with tracks having even track numbers, data in shaded regions is played back.

In this figure, the trace is started from one end of the tape at an extension of a track with the track number 0 (at a drum winding angle of 0 degrees) and ended at the other end of the tape at an extension of a track with the track number 8 (at a drum winding angle of 180 degrees). If the tape is traveling accurately at a 9.0-fold speed, the trace phase at a position with the 180-degree drum winding angle will increase in value by 9.0 when the number of tracks is counted.

Here, in this present invention, the output of a counter, which cyclically resets itself every time the contents thereof reach a speed multiplication factor, is used as a reference signal. This reference signal is then compared to the actual trace phase of the head to give a phase error to be supplied to a control system for controlling the traveling speed of the magnetic tape.

Figure 2:
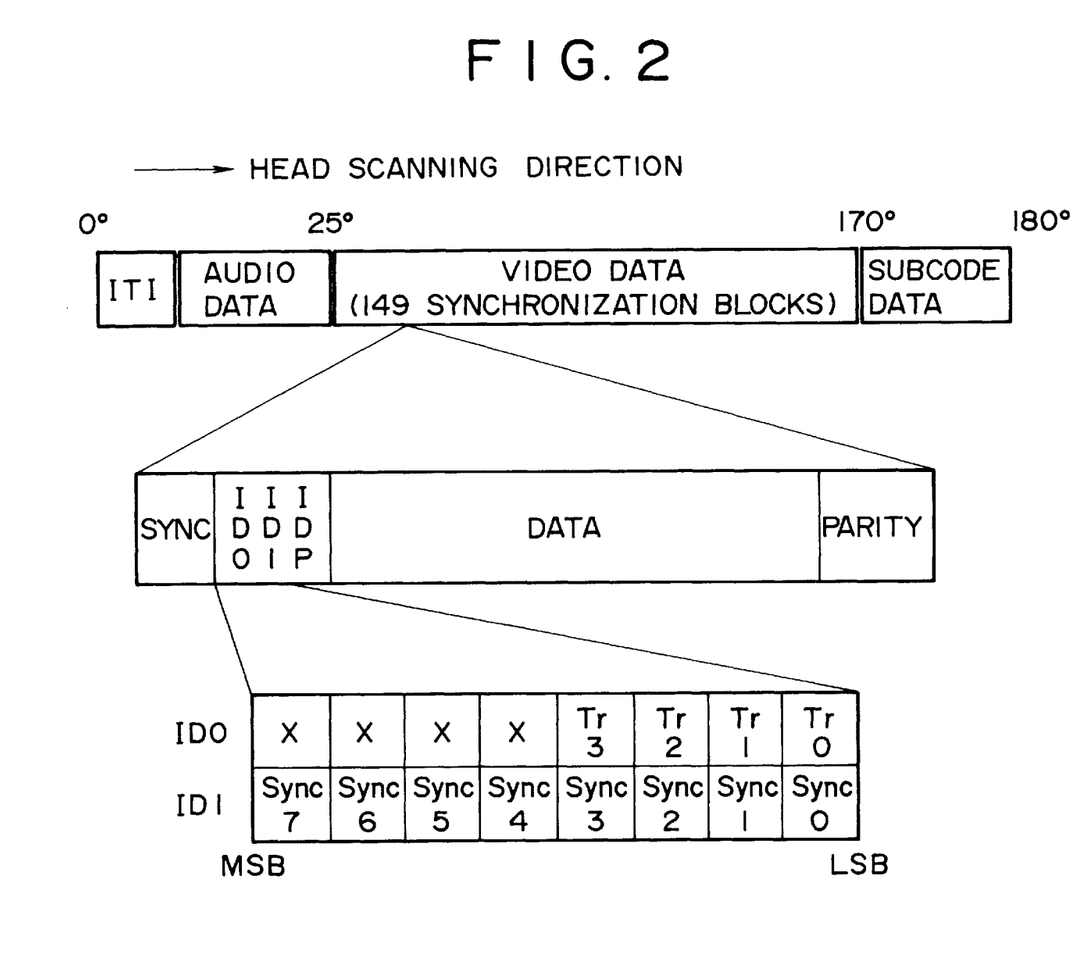
FIG. 2 is a diagram showing a typical structure of data actually recorded on a track.
Figure 3:
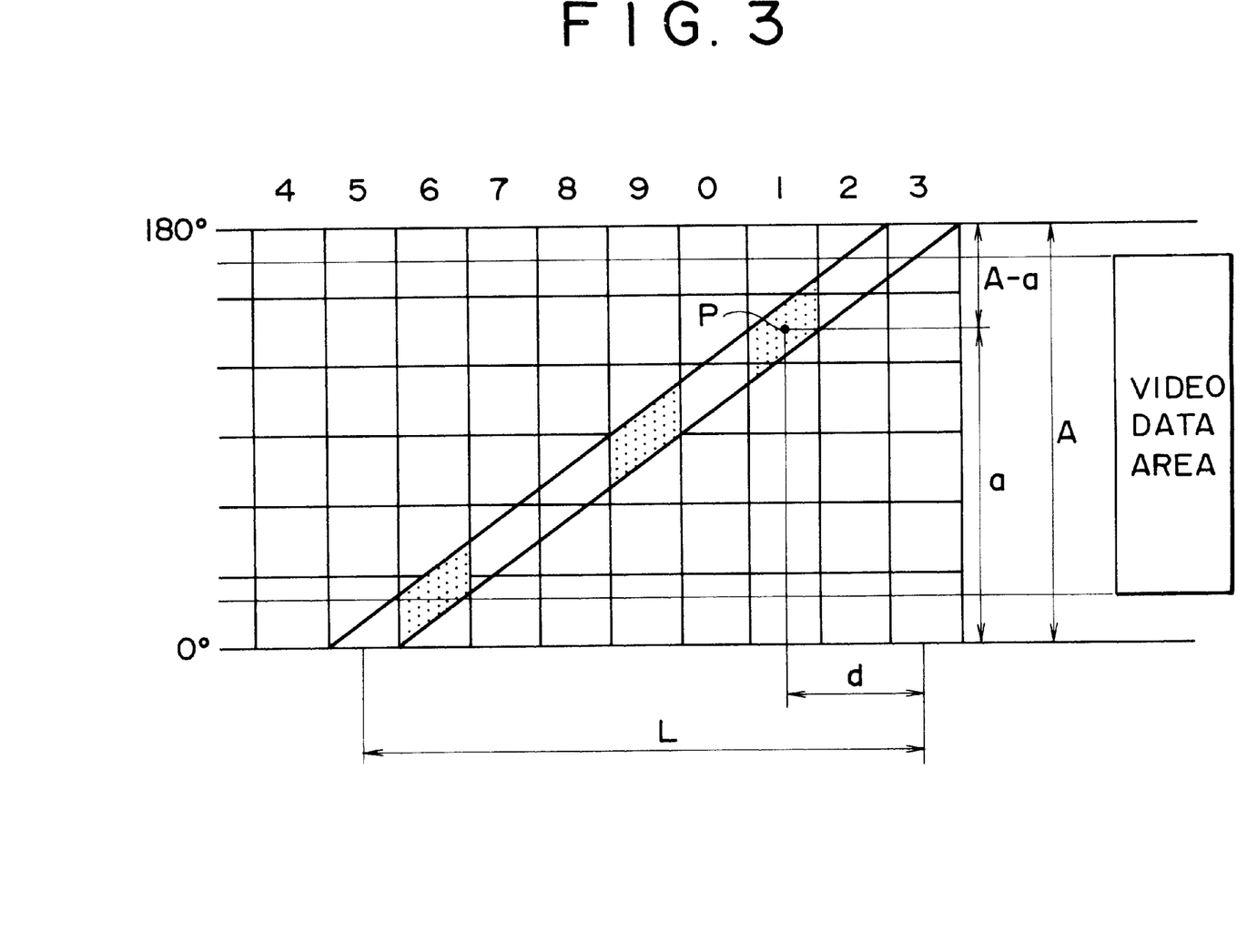
FIG. 3 is a diagram used for explaining a method as to how the trace phase is manipulated.

Next, a method for detecting the actual trace phase of the head is explained by referring to FIGS. 2 and 3.

FIG. 2 is a diagram showing a typical structure of data actually recorded on a track.

As shown in the figure, video data recorded in each track comprises 149 synchronization blocks, covering drum wrapping angles in the range about 25 to 170 degrees. An ITI and audio data precede the video data with the ITI recorded at the start end of the trace to be followed by the audio data. Subcode data is recorded, following the video data. The ITI comprises, among other information, reference data for detecting areas in which the audio data, the video data and the subcode data are recorded. In addition, the subcode data comprises additional information such as a recording time/date and a recording length. It should be noted that, since these pieces of information do not have direct relation to the present invention, no further description is provided.

Each synchronization block of the video data comprises a synchronization code, ID information and a parity code. The ID information comprises two data bytes and an IDP byte (or an ID parity). The low-order four bits of the first byte ID0 of the ID data are used for recording a track number. As described earlier, the track number has a value in the range 0 to 9 for identifying one of the tracks in each frame. The second byte ID1 of the ID data is used for recording a synchronization block number having a length of one byte. The synchronization block number is a sequence number for identifying a synchronization block among other pieces of data. In the video data area, the synchronization block number has a value in the range 19 to 167. In the present invention, the synchronization block number is used in conjunction with the track number for detecting the actual trace phase of the head. It should be noted that the IDP is a parity code used for detecting an error in the ID data. An error flag of the parity code is, in turn, used for controlling the memory control circuit 11 shown in FIG. 6.

A diagram of FIG. 3 is obtained by redrawing the trace pattern shown in FIG. 1 in such a way that the tracks are shown vertically. In addition, the trace of the head shown in FIG. 7 starts from track number 5 and ends at track number 3. Furthermore, a video data area at the right end of the figure represents areas of each track in which video data comprising 149 synchronization blocks is recorded. The symbol L denotes the number of tracks scanned in a single trace, being equal to the speed multiplication factor minus unity. The notation A denotes the width of the tape.

In this figure, a track number and a synchronization block number are detected from reproduced video data. Let the symbol P denote a point at the end of a scan where a synchronization block number is detected or a recording position of the last reproduced video data with its IDP indicating no error. Let the symbols Trp and Syp represent the detected track number and synchronization block number respectively. Let the symbol 'a' denote the distance from the point P to the trace start end expressed in terms of synchronization blocks and the symbol 'd' denote the distance from the point P to the center of a trace-end track expressed in terms of tracks.

The trace phase to be found is a track number at the 180-degree position. Let the symbol Tro denote this track number. Then, the following equation holds true: Tro=Trp+d. Since Trp is detected from the reproduced video data, Tro can thus be calculated by finding d. It is obvious from FIG. 3 that L:d=A:(A−a). Thus, d=L×(1−a/A). L can be found from the equation L=N−1 where N is the speed multiplication factor. Then, a and A need to be calculated in order to find d. The values of a and A vary, depending upon the recording format. For description purposes, an example is given as follows.

The video data area shown in FIG. 3 covers drum wrapping angles ranging from 24.9 to 169.1 degrees. Assume that the video data area is used for storing video data comprising 149 synchronization blocks. In this case, the number of synchronization blocks is 1.033 per degree. If the synchronization blocks are assumed to be spread uniformly from 0 to 180 degrees, a total of approximately 186 synchronization blocks exist. That is to say, A=186.

Under such an assumption, the synchronization block number at the 169.1-degree drum wrapping angle or at the tail end of the video data area is about 174.73. As described earlier, however, the synchronization block number at the tail end of the video data area is actually 167. Accordingly, the correction value is 7.73. In other words, a=Syp+7.73.

[2] Capstan Servo System Adopting the Invention

Figure 4:
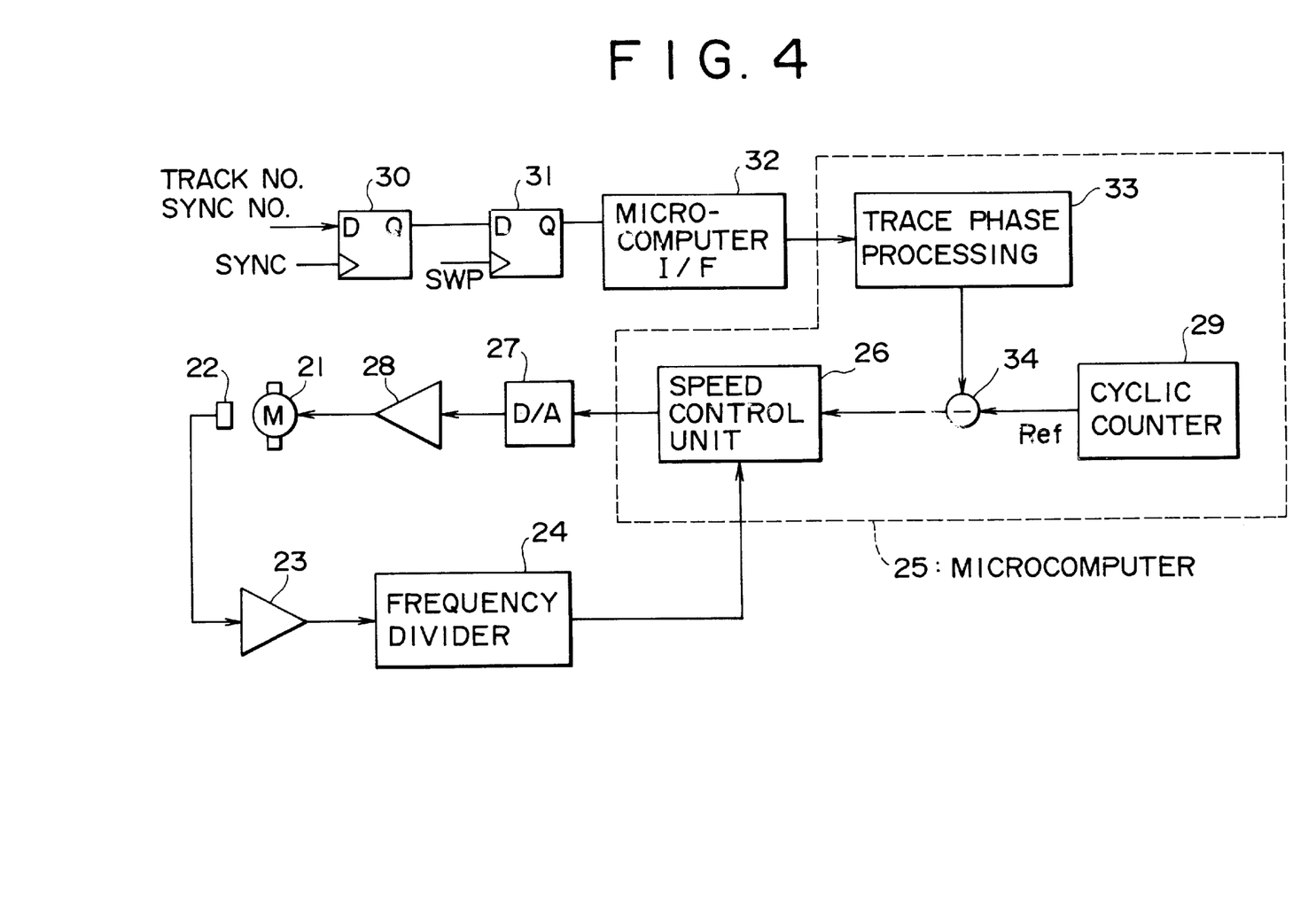
FIG. 4 is a block diagram of a typical capstan servo system to which the present invention is applied.

A typical capstan servo system to which the present invention is applied is shown in FIG. 4.

Basically, the capstan servo system detects the rotational speed of a capstan motor 21 by means of a capstan FG 22, amplifying the detected rotational speed by using an amplifier 23. The frequency of the amplified signal is then divided by a frequency dividing circuit 24, the output of which is supplied to a speed control unit 26 of a microcomputer 25. In the speed control unit 26, a reference speed signal set in accordance with the speed multiplication factor is compared to the output of the frequency dividing circuit 24, generating a speed error signal which is converted by a D/A conversion circuit 27 into an analog signal. This analog signal is then amplified by an amplifier 28 for generating a motor drive signal to be applied to the capstan motor 21. As a result, the traveling speed of the magnetic tape is controlled so that its value is brought to the reference speed set in accordance with the speed multiplication factor.

What is described above is the basic speed control operation. Since the speed is controlled not by detecting the actual traveling speed of the magnetic tape, however, it is feared that a discrepancy between the rotational speed of the capstan and the traveling speed of the actual magnetic tape is resulted in due to, among other causes, a slip between the driving system comprising the capstan and the pinch roller and the magnetic tape and the shrinking and stretching of the magnetic tape.

In order to solve the problem described above, in the present invention, the trace phase is detected by using the synchronization block number and the track number recorded on the magnetic tape. The trace phase is then compared to a reference trace phase to produce a phase error. By adding it to the error of the speed system of the speed control unit, the discrepancy from the actual speed of the magnetic speed can then be corrected.

In the embodiment shown in FIG. 4, a cyclic counter 29 produces the reference trace phase Ref. In the case of a 525/60 system, the truck number has a value in the range 0 to 9. In this case, the cyclic counter 29 can be implemented by a counter which rotates with a modulo of 10.

Figure 5:
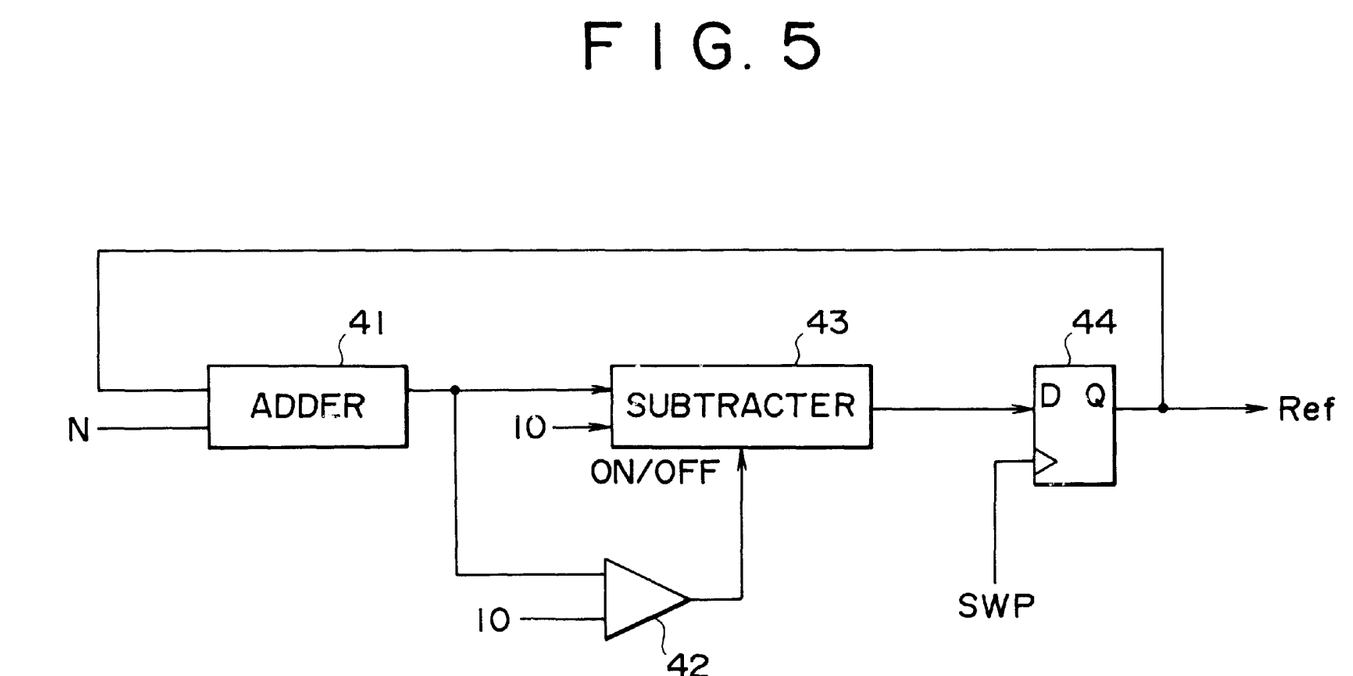
FIG. 5 is a diagram showing a typical actual configuration of a cyclic counter.

FIG. 5 is a diagram showing an actual configuration of the cyclic counter. As shown in the figure, the speed multiplication factor N is supplied to an adder 41 to be added to Ref, data output by this counter. The output of the adder 41 is supplied to a comparison circuit 42 to be compared to the value 10, the number of tracks per frame. Only if the output of the adder 41 is found greater than 10 will an ON/OFF control signal be generated to turn on the subtract operation of a subtracter 43. The subtracter 43 receives the output of the adder 41, carrying out a subtract operation in accordance with the ON/OFF control signal. With an output value of the adder 41 exceeding 10, the value 10 is subtracted from the output value. The output of the subtracter 43 is latched into a register 44 with timing determined by a head switching pulse SWP.

It should be noted that, in order to implement a non-integer speed multiplication factor, the speed multiplication factor N is multiplied by the nth power of 10 where n is an integer equal to or greater than unity. In the case of 9.1 times, for example, set N at 9,100. In this case, the reference value of the comparison circuit and the subtrahend of the subtracter are both set at 10,000.

A circuit for detecting the actual trace phase is explained by again referring to FIG. 4. A track number and a synchronization block number detected by the sync/ID detecting circuit 10 are latched in a register 30 with synchronization timing. The contents of the register 30 are updated every time a track number and a synchronization block number are detected and latched into a register 31 with the timing determined by the head switching pulse SWP. Accordingly, the data latched in the register 31 is the track number Trp and the synchronization block number Syp detected at the end of a scan. It should be noted that, for the sake of convenience, in the explanation given here, the track number and the synchronization block number are stored in the same register. In actuality, however, they are stored in two separate 8-bit registers.

The output of the latch 31 is transferred to a trace phase processing unit 33 employed in a microcomputer 25 through a microcomputer interface 32. The trace phase processing unit 33 derives the track number Tro at the position of the 180-degree wrapping angle from the track number Trp and the synchronization block number Syp supplied thereto.

The subtracter 34 produces a phase error from the reference trace phase described earlier and the actual trace phase processed in this way and supplies the phase error to the speed control unit 26. As a result, the capstan motor 21 is controlled so that the actual trace phase matches the reference trace phase.

The present invention has been described through an embodiment applied to a 525/60 system. It should be noted, however, that the present invention can also be applied to a 625/50 system and an HD system.

As described in detail so far, according to the present invention, a phase error is produced from track and synchronization block numbers, pieces of information recorded on a magnetic tape, for use in controlling the traveling speed of the magnetic tape. As a result, the traveling speed of the magnetic tape can be sustained at a constant value regardless of variations in the magnetic tape, the mechanical system and the like and changes in environmental conditions.

In addition, by merely changing the reference value of the phase error, the playback apparatus can keep up with any value of the traveling speed, allowing the speed multiplication factor to be set at a fine number with ease. Accordingly, the speed multiplication factor can be set at 9.48 times at which the screen is updated even if, for example, the data acquisition rate is low. As a result, the screen quality of the variable-speed playback operation can be sustained at a high level.

Furthermore, if only either the track number or the synchronization number is used in the calculation of the trace phase, the calculation becomes impossible when the synchronization information for a specific position with recording data existing can not be acquired. With this present invention, however, the calculation is always possible as long as synchronization information (an ID) of any place in a trace can be acquired, beefing up a guard against data defects.

What is claimed is:

1. An apparatus for reproducing digital information from recording tracks of a recording medium in which each track includes a number of synchronization blocks each having information indicative of a track number and information indicative of a synchronization block number, said apparatus comprising:

means for detecting a trace phase of a transducer based on the track number corresponding to a respective track from among said recording tracks and the synchronization block number identifying a synchronization block in said respective track;

means for receiving a speed multiplication signal representative of a desired playback speed and for generating a reference trace phase in accordance with said speed multiplication signal; and means for producing a phase error from said trace phase and said reference trace phase and supplying said phase error to a speed control system to control the speed of said recording medium, wherein the receiving and generating means includes an adder for adding said speed multiplication signal and an output signal from the receiving and generating means so as to form an added signal, a comparison circuit for comparing said added signal with a first predetermined value, and a subtractor for performing a subtracting operation on said added signal and a second predetermined value in response to a comparison result from said comparison circuit.

2. An apparatus according to claim 1, wherein said subtractor performs the subtracting operation only when the comparison result exceeds a third predetermined value.

3. An apparatus according to claim 2, wherein said first predetermined value, said second predetermined value, and said third predetermined value are the same.

4. A method for reproducing digital information from recording tracks of a recording medium in which each track includes a number of synchronization blocks each having information indicative of a track number and information indicative of a synchronization block number, said method comprising the steps of:

detecting a trace phase of a transducer based on the track number corresponding to a respective track from among said recording tracks and the synchronization block number identifying a synchronization block in said respective track;

receiving a speed multiplication signal representative of a desired playback speed and generating a reference trace phase in accordance with said speed multiplication signal; and producing a phase error from said trace phase and said reference trace phase and supplying said phase error to a speed control system to control the speed of said recording medium, wherein the step of receiving and generating includes adding said speed multiplication signal and an output signal so as to form an added signal, comparing said added signal with a first predetermined value, and performing a subtracting operation on said added signal and a second predetermined value in response to a comparison result obtained from comparing said added signal with said first predetermined value.

5. A method according to claim 4, wherein the subtracting operation is performed only when the comparison result exceeds a third predetermined value.

6. A method according to claim 5, wherein said first predetermined value, said second predetermined value, and said third predetermined value are the same.

* * * * *